United States Patent [19]

Martin

[11] 4,327,463
[45] May 4, 1982

[54] SINGLE STATION ANATOMICAL SECTION DE-BONING MACHINE

[75] Inventor: Eugene G. Martin, New Holland, Pa.

[73] Assignee: Victor F. Weaver, Inc., New Holland, Pa.

[21] Appl. No.: 196,139

[22] Filed: Oct. 10, 1980

[51] Int. Cl.³ ............................................. A22C 21/00
[52] U.S. Cl. ......................................... 17/11; 17/1 G
[58] Field of Search ............................... 17/11, 46, 1 G

[56] References Cited

U.S. PATENT DOCUMENTS

| | | |
|---|---|---|
| 2,897,536 | 8/1959 | Bergstrom et al. |
| 2,932,060 | 4/1960 | Massengill |
| 3,115,667 | 12/1963 | Lis et al. |
| 3,192,557 | 7/1965 | Segur |
| 3,216,056 | 11/1965 | Segur |
| 3,261,054 | 7/1966 | Kaplan et al. |
| 3,348,261 | 10/1967 | Segur |
| 3,483,591 | 12/1969 | Segur et al. |
| 3,510,908 | 5/1970 | Segur et al. |
| 3,581,337 | 6/1971 | Tonjum et al. |
| 3,629,903 | 12/1971 | Turner |
| 3,672,000 | 6/1972 | Martin et al. |
| 3,816,874 | 6/1974 | Jahnke |
| 3,965,535 | 6/1976 | Kaplan et al. |
| 4,041,572 | 8/1977 | Martin et al. |

*Primary Examiner*—Willie G. Abercrombie
*Attorney, Agent, or Firm*—Samuel M. Learned, Jr.

[57] ABSTRACT

A single station anatomical section de-boning machine, operable by one individual, which machine is comprised of a compound multiple-acting piston driven longitudinal cam activated to cycle and operate adjustably pre-set micro-switches upon manual oriented operator insertion of an elongated anatomical section into the operational head de-boning assembly depressably against a machine plunger trigger thereof, wherein the anatomical section for deboning processing is characterized by having a centrally-extending meat-encased bone member with joint protuberances at either longitudinal end thereof, to thereupon mechanically accomplish by high-speed sequential cycling of the compound multiple-acting piston driven longitudinal cam cooperatively with the pre-set micro-switches in the functioning of a cooperative toggle-acting gripper blade to closably engage and hold the anatomical section for pivotal closing immediately thereafter of shaped cooperative meat cutting and stripping blades to initiate and accomplish primary inverse peeling of the bone encasing meat therefrom followed by pivotal closing of other shaped cooperative peeling blades to accommodate completion of meat peeling about the smaller of the bone end protuberances whereafter a set of scissor-acting tendon severing blades operate to positively cut any remaining tendon connecting tissue from the peeled meat and the stripped bone, followed by pivotal opening of the other shaped cooperative peeling blades to release therefrom for deposit to a suitable container the removed meat and also at the same time an opening of the cooperative toggle-acting gripper blade to simultaneously therewith release the stripped bone therefrom for deposit to another container, thereafter followed by automatic recycling of the operational head de-boning assembly for continued manually initiated de-boning processing operations.

14 Claims, 15 Drawing Figures

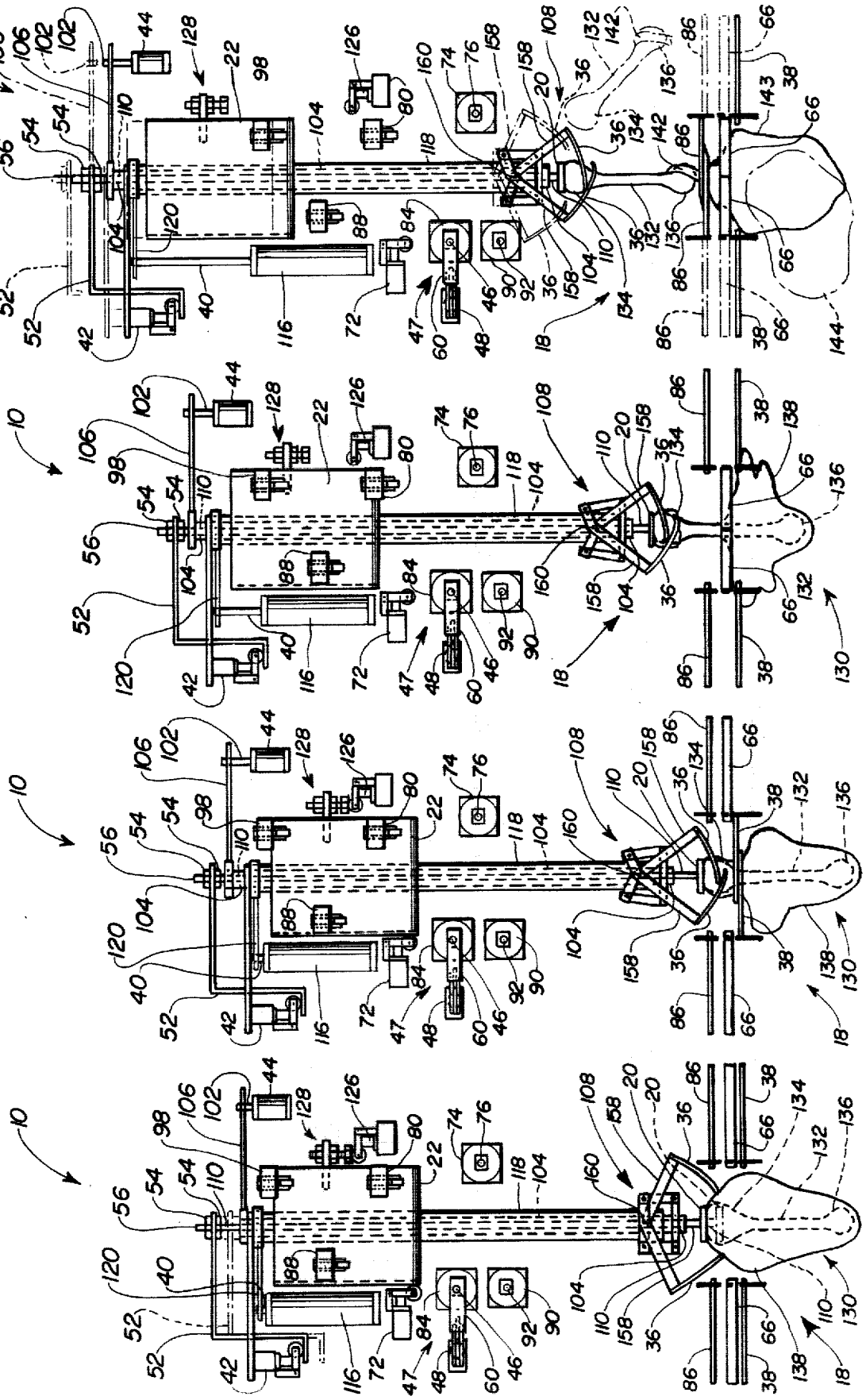

SINGLE STATION ANATOMICAL SECTION DE-BONING MACHINE

BACKGROUND OF THE INVENTION

The instant invention relates to a single station anatomical section de-boning machine operable by one individual wherein said machine provides a meat de-boning product output capability intermediate those of other currently available single or dual station de-boning machines and that of the high-speed multi-station anatomical section de-boning machine as taught by instant applicant's previous co-inventive disclosure recited in U.S. Pat. No. 4,041,572 dated Aug. 16, 1977, to Martin et al, further wherein, although as to be hereinafter more fully detailed being both mechanically and operationally distinguished from said other currently available single and/or dual station and multi-station de-boning machines it is to be understood the machine of the instant invention does utilize generally that meat removal method as taught by said applicant's previous co-inventive disclosure above-cited. It is also to be understood that the instant invention pertains to a single station machine for automatically de-boning appendicular anatomical sections of small edible animals such as rabbits, and fowl of various types which would include but not necessarily be limited to old and young chickens, turkeys, geese, ducks and guineas, or an appendicular section of any small edible animal wherein said section is anatomically characterized by having a centrally extending elongated meat encased bone shaft and at the respective longitudinal ends thereof a ball or a socket structure comprising the ball or socket parts of a ball-and-socket joint, exemplary only of which appendicular anatomical sections would be the thigh or upper arm wing sections of domesticated poultry or the like, to further include also drumstick sections of various fowl as aforedescribed.

The continually expanding convenience food market has further increased a need for highly reliable automated high product output machine capabilities for delivering various foodstuffs, not the least of which are de-boned chicken parts to provide an economy item popular for utility in both ease of preparation and service, as well as providing specialty poultry pieces for commercially prepared food service or restaurant menu features, or retail sales features of loose or packaged fresh or frozen all-meat pieces, or packaged pre-cooked convenience meal preparations.

Inherent to the handling and processing of anatomical sections, such as in de-boning operations, however, even with preclassified configuration, weight, and dimension segregation of a particular anatomical section item into a processing batch, to thereby facilitate machine handling thereof in providing processed product to meet growing demands, because of the practical differential range within various of the foregoing classification criteria, the limiting effects of which become more pronounced and critical as one attempts to increase the machine speed in automated handling and processing thereof, an optimum for balance of machine capability in terms of capital, maintenance, and manning costs versus net consummably acceptable product output so as to achieve an optimum processing cost per unit of processed product output evolves, in the case of immediate consideration being those cost factors resultant in the processing and delivery of a bone fragment free de-boned anatomical section.

Primarily, because of the anatomical section physical variation characteristics, coupled with continuing and increasing stringency of requirements for producing de-boned meat items substantially without either scraped or broken bone fragment contamination therein, the initial and many current anatomical section de-boning machine devices remain limited to various relatively low output manual and/or a combination of manual and relatively simple power operated single or dual station mechanical means for accomplishing separation of meat from bone. Exemplary of prior art teachings of the foregoing type, for the combined manual and manually operated mechanical removal of meat from appendicular anatomical sections as heretofore characterized would be those as set forth in U.S. Pat. No. 3,192,557 to Segur, dated July 6, 1965, and U.S. Pat. No. 3,629,903 to Turner, dated Dec. 28, 1971, wherein both the aforementioned disclosures teach static fixtures which are employed to facilitate the manual removal of meat. The teaching of U.S. Pat. No. 3,510,908 to Segur et al, dated May 12, 1970, discloses the use of static fixtures in combination with clamping jaws assembled to a piston-driven retractable carriage to accomplish powered mechanical removal of meat. Another U.S. Pat. No. 3,216,056 to Segur, dated Nov. 9, 1965, teaches an apparatus employing a pair of elongated spring arms which have notched ends that converge toward each other to plow the meat from poultry legs as the connected bones thereof are mechanically pulled relative to a complementary stationary meat removal plowing means. In a subsequent disclosure by Segur as taught in his U.S. Pat. No. 3,348,261 dated Oct. 24, 1967, a meat removal method embodying the foregoing apparatus accomplishes plowable removal of meat from a raw poultry leg after the meat thereon has been longitudinally sliced to the bone along at least one side thereof.

Machines providing automated anatomical section de-boning product output capabilities intermediate those of the relatively simple single and dual station machines above, and the previous co-inventive high-speed multi-station de-boning machine teaching of instant applicant in U.S. Pat. No. 4,041,572 would include those as disclosed in U.S. Pat. No. 3,261,054 to Kaplan et al, dated July 19, 1966, for removal of meat from pre-cooked poultry legs therein utilizing the cooperative mechanical action of strippers bars activated by rotating cams upon passage of the joint between a thigh and lower leg of that leg section being processed, and a later teaching likewise by Kaplan et al in U.S. Pat. No. 3,965,535 dated June 29, 1976, also for stripping meat from precooked poultry legs by the cooperative action of three rotating discs operating upon a poultry leg section being pulled therethrough. Other de-boning machines in the intermediate product output capability category would include the teaching of Bergstrom et al in U.S. Pat. No. 2,897,536 dated Aug. 4, 1959, employing the use of pairs of stripping rolls which engage the meat of a poultry leg while the leg is transported along by an endless chain engaging one end of the leg bone. In another co-inventive de-boning machine teaching by your instant applicant, in U.S. Pat. No. 3,672,000 to Martin et al, dated June 27, 1972, there is shown automated removal of the bone from poultry thigh sections by mechanically engaging and then by means of engagement of the thigh section by stripping blades, whereby the longitudinally movement thereof effects a removal of the meat from the bone.

Certain other anatomical section de-boning techniques, and the machinery therefor, are also shown by the prior art among which would be clamp-and-pull extraction de-boning as taught by Messengill in U.S. Pat. No. 2,932,060 dated Apr. 12, 1960, shear-cut de-boning as taught by Segur et al in U.S. Pat. No. 3,483,591 dated Dec. 16, 1969, and water jet de-boning as taught by Tonjum et al in U.S. Pat. No. 3,581,337 dated June 1, 1971.

The device of instant invention also utilizes scissor blade tendon severing means to effect positive cutting of any meat-to-bone connecting tendon tissue that may remain after primary meat removal operations, being functionally similar to but structurally and operationally distinguished from those scissor blade poultry processing devices respectively taught in U.S. Pat. No. 3,115,667 to Lis et al dated Dec. 31, 1963, and U.S. Pat. No. 3,816,874 to Jahnke dated June 18, 1974.

It should be understood that some of the features of the instant invention have, in some respects, various structural and functional similarities, in accomplishment of the anatomical section de-boning method of instant applicant's previous teaching in U.S. Pat. No. 4,041,572, to certain of the mechanical teachings separately set forth in the prior art disclosures heretofore cited and briefly discussed. However, as will hereinafter be specifically pointed out, the instant invention is distinguishable from said earlier inventions in one or more ways in that the present invention has structural embodiments to provide not only utility features but also new and useful advantages and improvements in the art of single station anatomical de-boning machines and enhancing net consummably acceptable substantially bone fragment free product output therefrom by means not heretofore known.

SUMMARY OF THE INVENTION

It is the principal object of the present invention to provide a single station anatomical section de-boning machine having an operational head de-boning assembly adapted to accomplish an anatomical section de-boning sequence being manually functioned by trigger activated reciprocating movement of a compound multiple-acting piston driven longitudinal cam initiated upon the manually trigger depressable feeding insertion of either a raw or precooked small edible animal appendicular anatomical section thereagainst, said anatomical section being characterized by having a centrally-extending elongated meat-encased bone member with protuberances at either end thereof, being at one end a ball comprising part of a ball-and-socket joint and at the other end a socket comprising part of another ball-and-socket joint, wherein the operational head de-boning assembly elements function sequentially upon longitudinal cam reciprocally displaced activation of adjustably pre-set microswitches to first cause, after trigger depressed activation, by manual oriented insertion of an anatomical section thereagainst, piston retractable cooperative toggle-acting gripper blade means to closably engage and hold during piston retractable movement the elongated bone member immediately inward of the larger of the two protuberances thereon followed immediately thereafter by pivotal closing of shaped cooperative meat cutting and stripping blades to annularly sever bone encasing meat to the bone shaft surface and thereafter function in a slight retraction of the fully closed configuration as cooperative stripping blades to initiate and accomplish inverse peeling of the bone encasing meat from said bone as the same continues retractable displacement to a longitudinal position just ahead of the smaller protuberance of said bone whereupon simultaneously the cooperative meat cutting and stripping blades pivotally open and a set of other shaped cooperative peeling blades pivotally close to accommodate completion of substantially bone fragment free peeling and removal of said bone encasing meat about and from the smaller bone protuberance, whereafter a set of scissor blade tendon serving means operate to positively cut any remaining tendon connecting tissue from the peeled meat and the stripped bone, followed by pivotal opening of said other shaped cooperative peeling blades to release therefrom the removed meat and also at the same time an opening of the cooperative toggleacting gripper blade means to simultaneously release the stripped bone therefrom, with finally a re-cycling advancement of the compound multiple-acting piston drive cylinder to position the trigger in re-set position for continued meat de-boning operations, all of which is accomplished without shearing or shattering said elongated bone member or either of the bone protuberances at either of the longitudinally disposed ends thereof.

Another object of the present invention is to provide a de-boning machine of the type described, which although being manually fed with anatomical sections for accomplishment of de-boning operations, once activated by trigger depressable manual insertion of an anatomical section thereto thereupon mechanically cycles at a high-speed de-boning sequence per se such that the inherent physical variation characteristics of an anatomical section input item for de-boning becomes much less of a processing run problem as a result of the manual placement feeding thereof, and upon oriented manual placement feed insertion positioning thereof the machine triggered de-boning mechanical sequence per se is at a cycle speed equivalent to that of current high-speed multi-station anatomical section de-boning machines, thereby herein teaching a machine capable of, under the control of a trained operator, delivering substantially bone fragment free de-boned anatomical sections at an optimum processing cost per unit of processed product output.

A further object of the instant invention is to provide a de-boning machine of the type described which is safe and simple in operation, as well as a machine which is easily and quickly adjustable to accommodate batch runs for de-boning processing of a larger or smaller anatomical section physical dimension category, all of which may be performed by an average employee not possessed of special skills after moderate training.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 4 is a simplified top plan view of said machine with the operational head de-boning assembly thereof in the anatomical section receiving configuration for commencement of a de-boning cycle.

FIG. 5 is a simplified top plan view of said machine with the operational head de-boning assembly thereof in the anatomical section meat peeling initiation configuration of the de-boning cycle.

FIG. 6 is a simplified top plan view of said machine with the operational head de-boning assembly thereof in the anatomical section meat peeling completion configuration of the de-boning cycle.

FIG. 7 is a simplified top plan view of said machine with the operational head de-boning assembly thereof in the anatomical section bone-to-peeled meat tendon severing configuration of the de-boning cycle, further showing therein in phantom respectively the removed bone and removed meat release cycles thereof immediately prior to recycle and reset of said machine for continued manually fed anatomical section de-boning operations.

DETAILED DESCRIPTION OF THE INVENTION

Figure 1:
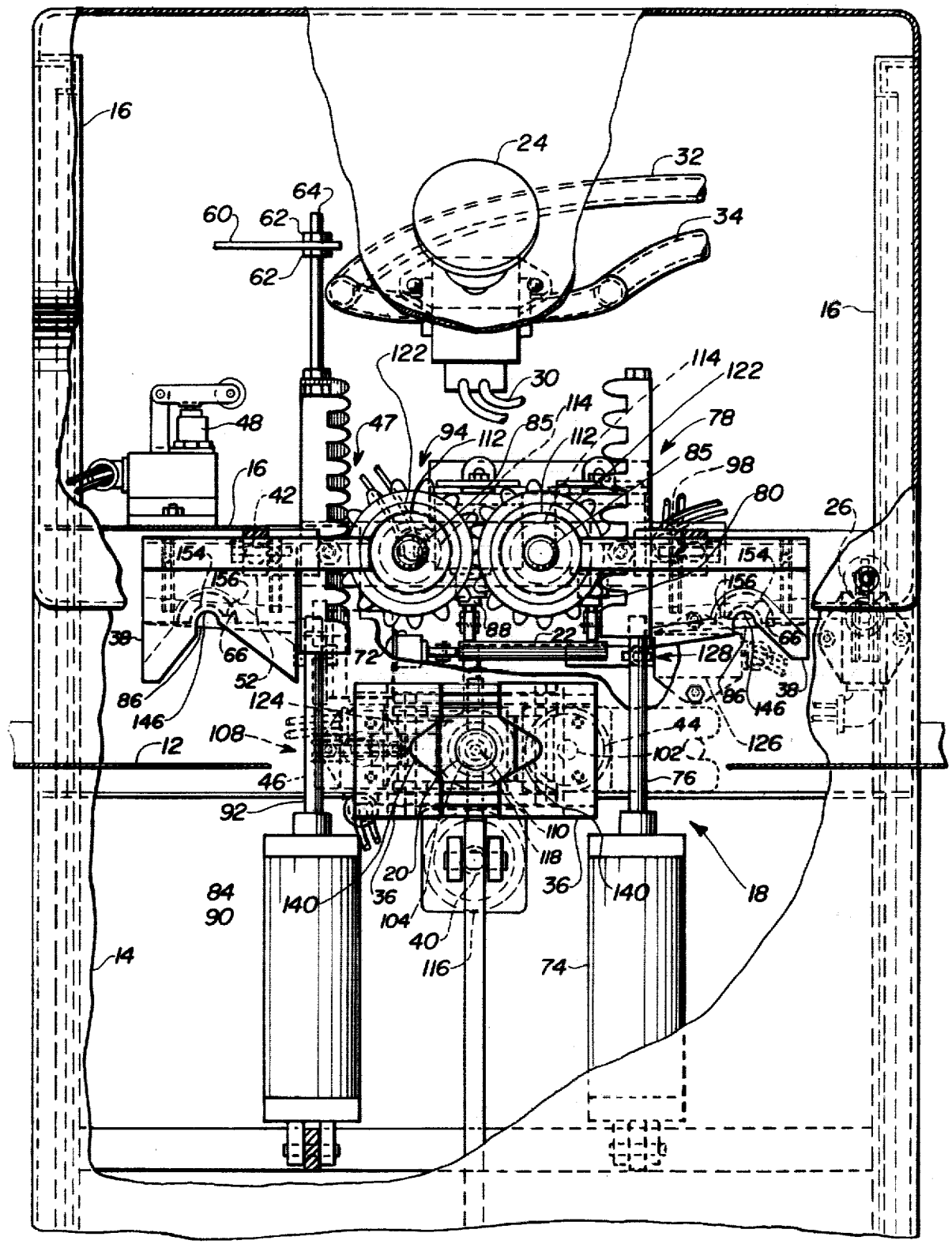
FIG. 1 is a front elevation of the single station anatomical section de-boning machine comprising the instant invention, the same being shown with the operational head de-boning assembly thereof in the re-cycled de-boning operational configuration wherein the enclosing cabinet structure of said machine is broken-away to better illustrate various of the electro-mechanically cooperative subassembly structures thereof.

Referring to FIG. 1, the present invention in a front brokenaway elevation view thereof is shown which comprises a single station anatomical section de-boning machine 10 mounted upon a suitable retaining structure such as a bench top support surface 12 or the like which may also alternately be an integral portable support cabinet structure, said machine 10 having a protectively enclosing cabinet structure 14 provided interior thereof with a longitudinally disposed support frame comprised of interconnected horizontally and vertically disposed structural members 16 to support an operational head de-boning assembly 18 activated by a machine plunger trigger 20 to cycle a compound multiple-acting pneumatic cylinder piston driven longitudinal cam 22 which displaceably engages, a sequentially, upon compound multiple-acting pneumatically driven cylinder cycling thereof a plurality of pre-set electrical solenoid air valve limit switches longitudinally displaced therealong the upper and side surface proximities thereof to thereby in turn respectively cycle pre-set auxiliary double-acting pneumatic piston driven cylinders to cause the sequential high-speed commencement and completion, upon manually fed initiation by an anatomical section, de-boning processing operation functions by means of said operational head de-boning assembly 18 and thereafter further accomplish respectively electrical and pneumatic phase re-cycle and re-set functions for continued anatomical section manually fed and initiated machine 10 high-speed de-boning processing operations per se.

Figure 2:
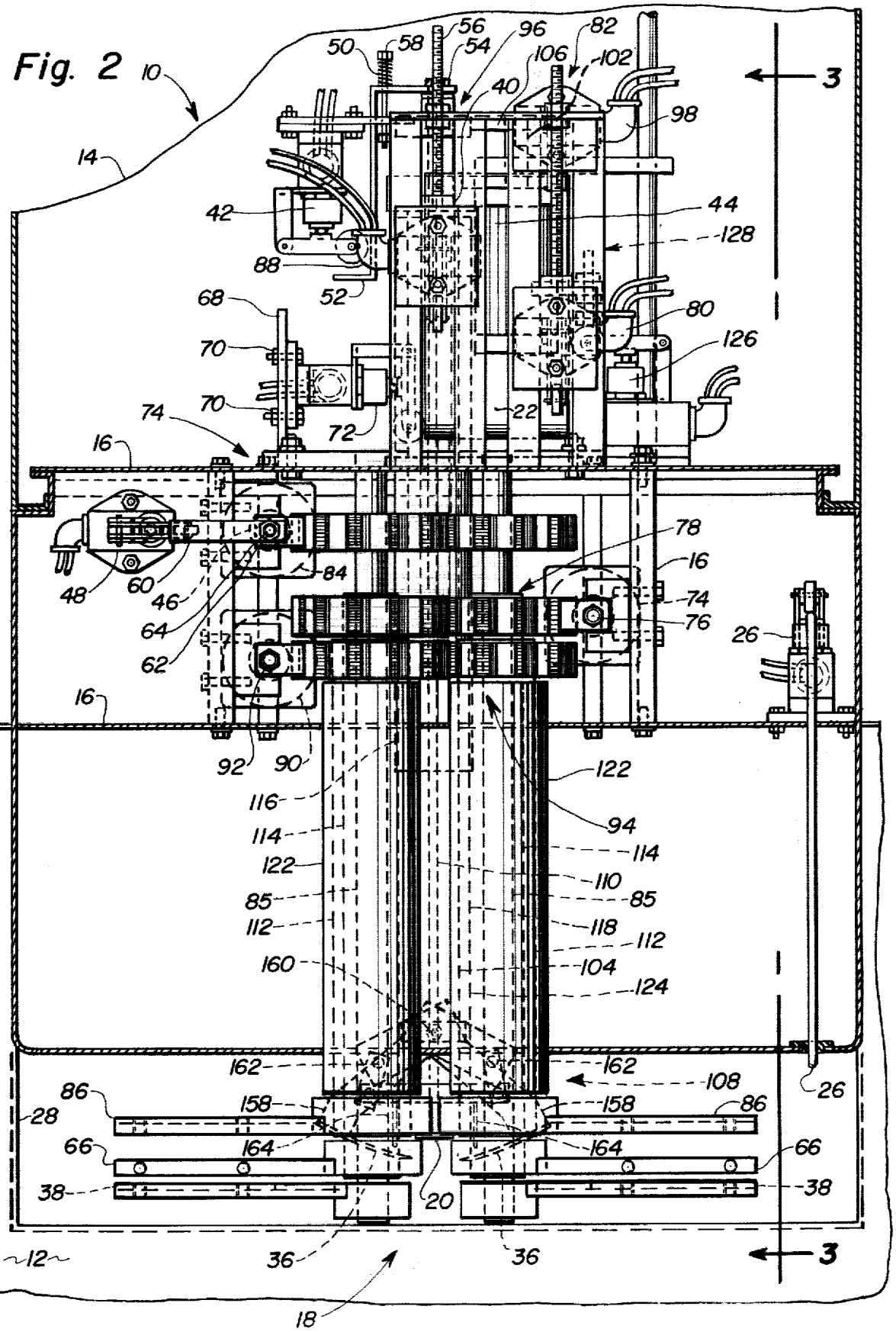
FIG. 2 is a top plan view of said machine taken from FIG. 1 showing therein additional illustration of various of the electromechanically cooperative sub-assembly structures thereof when said operational head de-boning assembly is in the re-cycled de-boning operational configuration.
Figure 3:
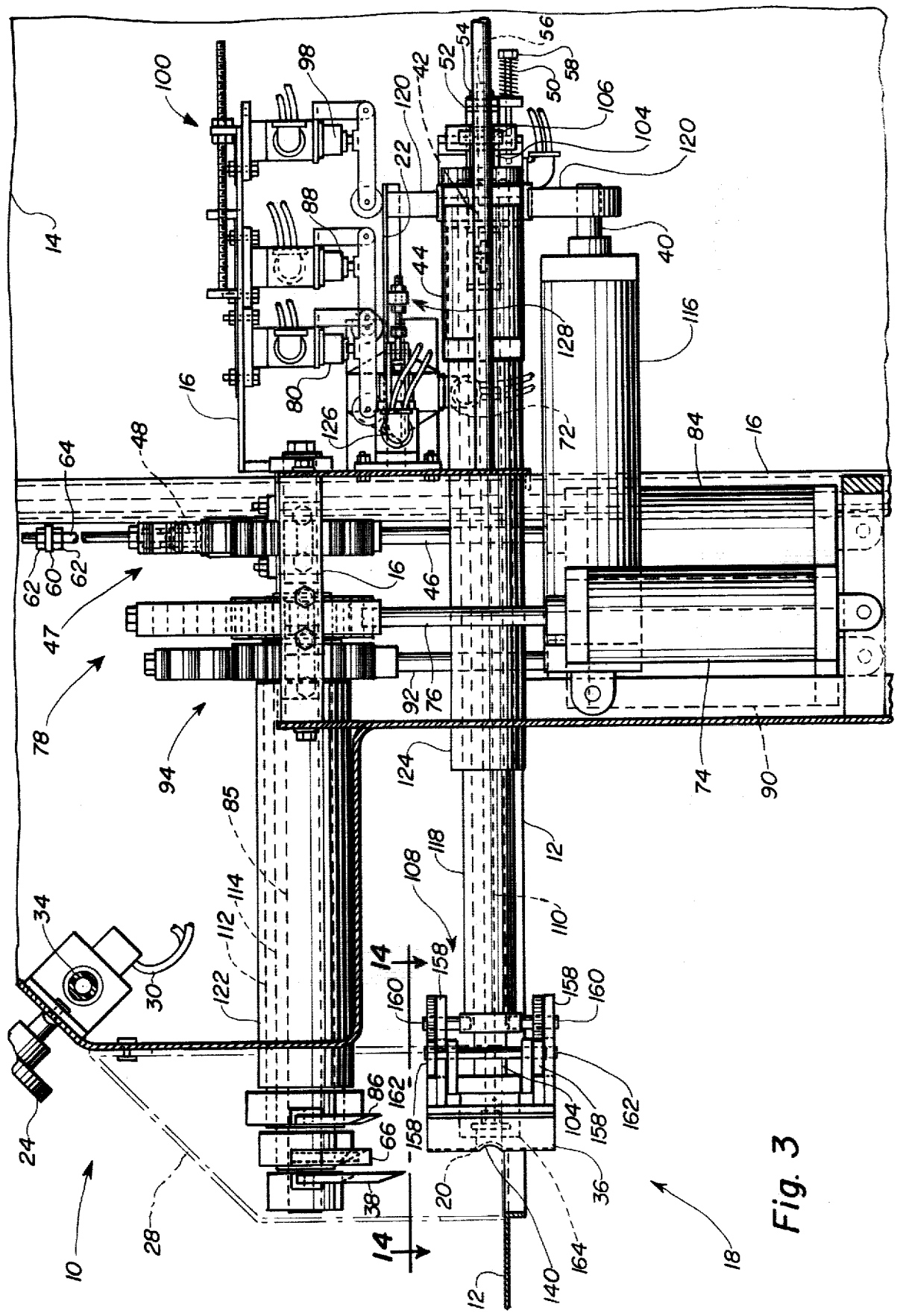
FIG. 3 is a side elevation of said machine shown in FIG. 2 as seen along the line 3—3 thereof.

Referring again to FIG. 1, as well as also concurrently therewith respectively to the top plan and side elevation views of FIGS. 2 and 3 of said machine 10 to describe in greater detail the component parts of this invention as well as explain the makeready set-up thereof wherein is also shown both the electrical/pneumatic feed lines ON/OFF-RESET safety switch 24 employed to accomplish full function machine 10 inoperative stops during either de-boning set-up procedures or run operations emergencies, and the pivotal cabinet cover electrical interlock safety switch 26, the latter of which is a normally open switch whereby said machine 10 is functionally rendered inoperatively safe during times when the operational head blade-protective pivotal cabinet cover 28 is elevated by an operator for performance of maintenance functions and/or also machine 10 set operations to be hereinafter more fully described.

Presuming a makeready set-up of said machine 10 for the de-boning processing of a pre-classified configuration, weight, and dimension segregated anatomical section batch, and for purposes of immediate discussion only consider said anatomical section batch to be comprised of chicken thighs which are exemplary of anatomical members of small edible animals physically and structurally characterized by the anatomical section definition heretofore set forth herein, and further presuming said machine 10 has been previously connected by standard methods well known in the art to an appropriate electrical current powering source by means of the primary electrical power switch conduits 30 for powering of the plurality of pre-set electrical solenoid air valve limit switches thereof, and also connected to the plant air by means of the pneumatic feed line hook-up conduit 32 likewise by standard methods well known in the art for pneumatic powering through pneumatic feed line delivery conduit 34 of the compound multiple-acting and auxiliary cylinders also of said machine 10.

Prior to the performance of any maintenance or makeready functions on an electrically and/or pneumatically connected machine 10, however, the operator thereof first positions the electrical/pneumatic feed lines ON/OFF-RESET safety switch 24 to the depressed OFF position to thereby prevent both electrical solenoid air valve limit switch activation and pneumatic powering of various of said cylinders, and, secondly, as a back-up safety measure when the operator pivotally raises the operational head blade-protective pivotal cabinet cover 28 for obtaining access to the various switch and cylinder cycling and duration and/or dimension adjustment means to be hereinafter described in detail the normally open pivotal cabinet cover electrical interlock safety switch 26 thereupon opens and thereby also breaks the electrical current powering circuit to the various of the plurality of pre-set electrical solenoid air valve limit switches of said machine 10 whereby said cylinders are otherwise cycled to operate to thus render an electrically and pneumatically installed machine 10 functionally inoperative for purposes of either maintenance or makeready set-up.

In accomplishing makeready set-up of said machine 10 the various electrical solenoid air valve limit switches thereof will be physically adjusted relative to a de-boning sequence displacement cycling of the compound multiple-acting pneumatic cylinder piston driven longitudinal cam 22 so as to activate and effect pneumatic energizing and de-energizing of said cylinders, which are all double acting, whereby the various elements of the operational head de-boning assembly 18 are driven, all of which makeready set-up adjustments relative to said cam 22 in turn being made relative to a typical anatomical section piece from the pre-classified configuration, weight, and dimension segregated batch thereof. In the foregoing respect the initial operator adjustment to be accomplished on makeready set-up of said machine 10 is that of the plunger trigger 20 thereof being adjusted to be made functional dimensionally to the section in causing activation of the cooperative toggle-acting anatomical section gripper blades 36 whereby an anatomical section is securely engaged and retained in addition to simultaneously therewith activating a closing of the shaped cooperative meat cutting and stripping blades 38 of the operational head de-boning assembly 18 plus also thereupon sequentially in turn immediately thereafter initiating activation into a draw cycling mode the compound multiple-acting pneumatic cylinder main drive piston 40 thereby moving machine rearward in assembly thereto the closed cooperative toggle-actikng anatomical section gripper blades 36 with an anatomical section securely engaged and retained thereby and also said longitudinal cam 22 for progressive accomplishment of the high-speed anatomical section de-boning sequence by said machine 10. The means which activates the foregoing initiation of an anatomical section de-boning sequence is first a manual closing of the plunger trigger electrical solenoid air valve limit switch 42 made upon oriented manual insertion of an anatomical section to the plunger trigger 20 of said machine 10 which when made activates the cooperative toggle-acting anatomical section gripper blade cylinder 44 to extend machine rearward and cause a section engaging and retaining gripping of said section by said gripper blades 36 which plunger trigger limit switch 42 also simultaneous therewith activates the shaped cooperative meat cutting and stripping blade cylinder piston 46 to retract and through the shaped cooperative meat cutting and stripping rack-and-pinion assembly 47 driven thereby cause a cooperative counter-rotation closing of the shaped cooperative meat cutting and stripping blades 38 which when completed thereupon causes a closing of the compound multiple-acting pneumatic cylinder main drive piston electrical solenoid air valve limit switch 48 thereby initiating said main drive piston 40 into the machine rearward extending draw cycling mode as aforedescribed.

In use, manually fed oriented delivery of an anatomical section piece is made to said machine 10 with the larger of the longitudinal bone shaft end protuberances of said section piece, that is the socket joint thereof, directed to the plunger trigger 20. In the makeready set of said trigger 20 to accommodate the engagement and retention in manual feed delivery orientation of said anatomical section to initiate the de-boning sequence the larger longitudinal bone shaft end protuberance thereof is directed to be manually pushed against, and cause retractible longitudinal depression of said plunger trigger 20 compressively against the extensive force of a trigger set compression spring 50 operating against the plunger trigger switch contact bracket 52 as is best illustrated in FIG. 2. The retracted displacement length to which the plunger trigger 20 may be pushed before the plunger trigger switch contact bracket 52 engages and causes the plunger trigger electrical solenoid air valve limit switch 42 to make contact and activate the cooperative toggle-acting anatomical section gripper blade cylinder 44 to cause piston extension thereof and thereupon gripper blade 36 engagement of an anatomical section is determined for makeready set by the longitudinal dimension size of the larger bone shaft end protuberance thereof and is set by compressive longitudinal threaded trigger shaft nuts 54 adjustment of said bracket 52 through an opening therein along the threaded trigger shaft 56 which adjustment is made such that when the gripper blades 36 are closed the larger bone shaft protuberance is contained between the plunger trigger face surface and said gripper blades 36 and not cut into by the latter. Lastly, in respect to plunger trigger 20 makeready set adjustment, the trigger set compression spring 50 is set, after the foregoing gripper blade 36 anatomical section larger bone shaft end protuberance set, to a retracted displacement length sufficient to enable the making of contact of the plunger trigger electrical solenoid air valve limit switch 42 such that, however, the bottom-out compression retracted displacement length of said trigger set compression spring 50 is just beyond that deflection necessary to make contact but being short of the deflective limit of said plunger trigger limit switch 42 per se as adjustably compensated by means of the trigger set compression spring guide and adjustment bolt 58 whereby said plunger trigger limit switch 42 in heavy use application is protected from overcompressive displacement damage and the effects of excessive wear if not so set.

Upon completion of the plunger trigger switch contact bracket 52 and trigger set compression spring 50 makeready adjustments as aforesaid for accomplishing an anatomical section engagement and retention by oriented manual delivery insertion of the larger bone shaft end protuberance of such a section depressively against the plunger trigger 20 of said machine 10 so as to mechanically cause the cooperative toggle-acting anatomical section gripper blade 36 assembly closing and secure holding thereof, whereupon manual manipulative de-boning processing operation control per se upon such a securely held anatomical section is thereupon relinquished to the high-speed mechanisms of said machine 10, one is at a point for accomplishing makeready sets of machine 10 automatic de-boning processing operations per se, the first of which such set is that of a single adjustment with the dual functions of establishing both depth of cut of the shaped meat cutting and stripping blades 38 and also initiating and maintaining machine rearward extension draw cycling of the main drive piston 40 being made by means of setting the shaped cooperative meat cutting and stripping blade cylinder piston 46 draw through vertically adjusting the compound multiple-acting pneumatic cylinder main drive piston electrical solenoid air valve limit switch contact bracket 60 in turn by the means of vertically displacing compressively retaining adjustment nuts 62 threadably communicating with the threaded cylinder piston extension 64, either up or down thereon respectively for smaller and larger anatomical section elongated bone shaft diameters. For, however, this particular set with respect to the average bone shaft diameter of the anatomical section batch being run the optimum set is accomplished by vertically adjusting said limit switch contact bracket 60 to that elevation whereby a making of contact of said air valve limit switch 48 will stop the cylinder piston 46 retractable driving of said shaped cooperative meat cutting and stripping rack-and-pinion assembly 47 at that point where the counter-rotated shaped cooperative meat cutting and stripping blades 38 coactively shaped depth of cut into the anatomical section bone encasing meat immediately adjacent but longitudinally slightly off-set machine forward along the anatomical section elongated longitudinal bone shaft dimension from the closed position of said cooperative toggle-acting anatomical section gripper blades 36 is such that the shaped severing surfaces of said blades 38 do not cut into the bone shaft per se so as to thereby cause bone fragment contamination of the meat removed therefrom during the stripping operations but likewise forms a coactive bone shaft opening sufficiently approximating the average elongated longitudinal bone shaft dimension diameter so as to enable maximum stripped meat removal therefrom, while simultaneously thereupon and coincidental therewith causing also a set of said air valve limit switch 48 to initiate and maintain the machine rearward extending draw cycling mode of the main drive piston 40 which transports machine rearward relative to the stationary closed shaped cooperative meat cutting and stripping blades 38 both the closed cooperative toggle-acting anatomical section gripper blades with an anatomical section securely engaged and retained in oriented disposition as aforesaid thereby, as well as also the compound multiple-acting pneumatic cylinder piston driven longitudinal cam 22 whereby subsequent automatic machine 10 high-speed de-boning processing operation functions are caused, through mechanical engagement or disengagement of other adjustably set electrical solenoid air valve limit switches, to be either commenced or ceased.

It is to be understood, as will be more fully described hereinafter, that as the clamped and secured anatomical section is displaced machine rearward relative to the stationary closed shaped cooperative meat cutting and stripping blades 38 by those mechanisms immediately described above, the meat of said anatomical section is thereby progressively and annularly peeled longitudinally from the elongated bone shaft of said section to the proximity of the smaller of the bone shaft protuberances of said anatomical section, being the ball joint thereof, and it is with respect to the elongated bone shaft length between the larger and smaller end protuberances that the next machine 10 automatic high-speed de-boning processing makeready set adjustment is made, which is as follows.

In order to insure optimum peeled meat removal yield not only with respect to the elongated bone shaft diameter but also with respect to the longitudinal distance between elongated bone shaft protuberances, and presuming an optimum set with regard thereto of the shaped cooperative meat cutting and stripping blades 38 in immediately adjacent but longitudinally slightly off-set proximity to the closed cooperative toggle-acting anatomical section gripper blades 36 as aforedescribed, one will then respectively set that electrical solenoid air valve limit switch for causing coactive pivotal closing of the detented peeling blades 66 whereby continued strippable removal of the anatomical section meat is accommodated about the smaller ball end protuberance of said elongated bone shaft during completion of the machine rearward extension draw cycling mode of the main drive piston 40, and to further prevent bone fragment contamination of the removed meat set that other electrical solenoid air valve limit switch so as to cause simultaneous therewith coactive pivotal opening of said shaped cooperative meat cutting and stripping blades 38 just in sufficient time to not result in a nicking or chipping of bone fragment from the smaller bone shaft protuberance but also not so soon as to prevent optimum elongated disposition meat removal from said bone shaft. It is the longitudinal adjustable displacement of those electrical solenoid air valve limit switches aforesaid with respect to the relative positions thereof to the displacing main drive piston 40 driven longitudinal cam 22 and the elongated dimension configuration of that anatomical section member to which machine 10 set is being made that makeready is accommodated, and in the instance of causing a closing of the detented peeling blades 66 being accomplished by means of longitudinally displacing along switch mounting bracket 68 and establishing in fixed relationship therealong by means of switch mounting bracket compression set bolts 70 the detented peeling blade electrical solenoid air valve limit switch 72 with respect to said driven longitudinal cam 22 as best seen in FIG. 2 but also seen in FIG. 1, whereby the double acting detented peeling blade cylinder 74 is activated to cause retraction of the detented peeling blade cylinder piston 76 whereby in turn the detented peeling blade rack-and-pinion assembly 78 is driven thereby to cause a counter-rotation closing of the detented peeling blades 66 to a coactively shaped closed cooperative disposition whereby continued progressive annular peeling of the anatomical section meat longitudinally along and about the smaller protuberance of the elongated bone shaft is accommodated without bone fragment contamination thereof, which to be accomplished further requires an adjustment setting of the shaped cooperative meat cutting and stripping blade electrical solenoid air valve limit switch 80 by means of the threaded rod/set nut adjustment assembly 82 connected thereto as best seen in FIG. 2 but also seen in FIG. 3, which activates a reversing of the double-acting shaped cooperative meat cutting and stripping blade cylinder 84 to extend the piston 46 thereof in reverse-driving the shaped cooperative meat cutting and stripping rack-and-pinion assembly 47 and thereby cause a coactive counter-rotation opening of said shaped cooperative meat cutting and stripping blades 38 as transmitted thereto from said assembly 47 respectively to said blades 38 by connectably intercommunicating double-acting shaped cooperative meat cutting and stripping blade rotating transmission shafts 85 to thereby enable continued progressive annular peeling of the anatomical section meat about the elongated bone shaft smaller protuberance by said detented peeling blades 66 as aforesaid.

It is by means of the closed detented peeling blades 66, which are set to remain upon closing closed for the duration through completion of annular peeled removal of the anatomical section meat about the smaller protuberance of the elongated bone shaft, that stripped annular removal per se of the encasing meat of an anatomical section from the elongated bone shaft member thereof is accomplished by means of said machine 10, which duration of close of said detented peeling blades 66 to opening is set coincidentally, as are certain other of various machine 10 operational function sets to be hereinafter more fully described in detail, with the set of the end of duration of the draw cycle mode of the compound multiple acting pneumatic cylinder main drive piston 40. Suffice it to say for the moment, however, by means of said detented peeling blades 66, which upon closing form an opening shaped to accommodate continued annular passage removal of the peeled meat about the smaller protuberance of said elongated bone shaft, and since being constructed of a rigidly pliable plastic material so as to enable yieldable passage of the detented opening of said peeling blades 66 in close optimum meat peeling dwell tracking about the elongated bone shaft smaller protuberance rather than causing the nicking or scraping of meat contaminating bone fragment material therefrom as in practice would be resultant if continued annular meat stripping removal about said elongated bone shaft smaller protuberance were attempted with the hardened metal material of the shaped cooperative meat cutting and stripping blades 38, such that the anatomical section meat by use of said detented peeling blades 66 is peeled free of bone fragment material to a distended position from the bone shaft to remain connected thereto, if at all, by stretched tendon tissue therebetween with the smaller protuberance of the elongated bone shaft and it is for accomplishing the severing of such stretched tendon connecting tissue which may remain that the next machine 10 makeready set is made as follows.

Severing of any stretched tendon connecting tissue at the end of annularly peeled removal of the bone encasing anatomical section meat by means of the detented peeling blades 66 generally as aforedescribed is completed by means of a set of scissor-acting tendon severing blades 86 which are cycled to function by means of longitudinally setting the tendon severing blade electrical solenoid air valve limit switch 88 with respect to the machine rearward longitudinally displacing compound multiple-acting pneumatic cylinder piston driven longitudinal cam 22 and the switch 88 activation to pneumatic powering of the tendon severing blade cylinder 90 to cause retraction of the tendon severing blade cylinder piston 92 thereby driving the tendon severing blade rack-and-pinion assembly 94 in coactive counter-rotation to cause a tendon severing closing of said scissor-acting tendon severing blades 86 to cut cleanly and quickly the stretched tendon removed meat to bone shaft connecting tissue thereby effecting a separation of the anatomical section removed meat from the elongated bone shaft member thereof. In order to assure maximum severable meat separation the tendon severing blade electrical solenoid air valve limit switch 88 should be set by means of a second threaded rod/set nut adjustment assembly 96 connected therewith to a point of closeness to the smaller of the elongated bone shaft protuberance to closely sever the tendon tissue but not chip bone fragment therefrom.

At this point all makeready sets of machine 10 for accommodating accomplishment per se of the manually fed anatomical section in oriented trigger depressable delivery and initiation thereby to functional completion of high-speed automatic de-boning processing operations by said machine 10 have been made, with such makeready sets having been adjusted to accept a typical anatomical section of given physical characteristics as being representative of those remaining to be taken from a pre-classified configuration, weight, and dimension segregated anatomical section batch for de-boning processing, with all such machine 10 makeready sets having been established in order to obtain therefrom an optimum yield of removed meat substantially absent any mechanically scraped or chipped bone fragment contamination therewith. That which remains to be set with respect to continued operation of machine 10 in accomplishing production run repetitive de-boning operation cycles in completing the particular anatomical section batch to be processed, however, is first establishing by additional limit switch set an effectuation of the end of duration of the draw cycle mode of the compound multiple acting pneumatic cylinder main drive piston 40 whereupon sequentially coincidental thereupon and substantially therewith various other of the machine 10 functional components are cycled to release respectively the separated anatomical section bone and meat components and are thereafter recycled to de-boning processing start positions, and lastly establishing by a second additional limit switch set the sensing to reset completion of all machine 10 recycled functional components as aforesaid for continued mechanically repetitive anatomical section de-boning processing operations as set.

As to machine 10 de-boning processing operation recycle set, and as best seen in FIG. 3, it is by means of the machine recycle electrical solenoid air valve limit switch 98 and making longitudinally variable adjustment thereof by means of a third threaded rod/set nut adjustment assembly 100 as regards the passage of said cam 22 thereby with respect to the elongated bone shaft length totally of a representative batch run anatomical section sample that said limit switch 98 activating function is set to initiate the following events. First, the double-acting function of the cooperative toggle-acting anatomical section gripper blade cylinder 44 is reversed to retract the extended anatomical section gripper blade cylinder piston 102 thereof and transmit such cylinder piston 102 retractive motion to the reciprocally operable connecting rod 104 through the gripper blade cylinder to connecting rod arm 106 being respectively joined by interconnected communication therebetween which in turn thereby causes a mechanically driven opening of the cooperative toggle-acting anatomical section gripper blades 36 through the gripper blade connecting rod 104 cylinder piston 102 retractive motion transmitted to the pivotally operable toggle-acting linkage assembly 108 communicably supporting said gripper blades 36 and simultaneously coincidental therewith also causes a return to reset extension of the machine plunger trigger 20 threadably assembled to the machine forward end of the reciprocally operable trigger connecting rod 110 by re-operable extensive force of the trigger set compression spring 50 upon retraction of said cylinder piston 102 as well as also reset extension of the plunger trigger switch contact bracket 52 adjustably assembled as aforedescribed to the threaded trigger shaft 56 machine rearward end of said trigger connecting rod 110 and likewise reciprocally operable upon extension of said trigger set compression spring 50, and thereupon release from machine secured engagement the stripped anatomical section elongated bone shaft. Second, the double-acting function of the tendon severing blade cylinder 90 is reversed to extend the retracted cylinder piston 92 thereof and thereby cause a mechanically driven coactive counter-rotation opening through rack-and-pinion assembly 94 of the scissor-acting tendon severing blades 86 as transmitted thereto from said assembly 94 respectively to said blades 86 by connectably intercommunicating blade rotating transmission shafts 112. Third, the double-acting function of the detented peeling blade cylinder 74 is reversed to extend the retracted cylinder piston 76 thereof and thereby cause a mechanically driven coactive counter-rotation opening through rack-and-pinion assembly 78 of the detented peeling blades 66 as transmitted thereto from said assembly 78 respectively to said peeling blades 66 by connectably intercommunicating peeling blade rotating transmission shafts 114 and thereupon release therefrom the separated and substantially bone fragment free peeled anatomical section bone encasing meat. Fourthly, and lastly in recycle, the double-acting compound multiple-acting pneumatic cylinder main drive 116 is reversed to retract the extended drive piston 40 thereof and transmit such drive piston 40 retractive motion to the reciprocally operable gripper blade support tube 118 through the drive piston to support tube arm 120 being respectively joined by interconnected communication therebetween which in turn thereby causes a reciprocating recycle return to de-boning processing operation reset position of the gripper blade support tube 118 and the machine forward end cooperative toggle-acting anatomical section gripper blades 36 supportably carried thereby as well as also the compound multiple-acting pneumatic cylinder piston driven longitudinal cam 22 also connected to the drive piston to support tube arm 120 upward thereof.

Additional machine 10 structural features shown in FIGS. 1, 2, and 3 as relates to the foregoing include the operational head de-boning assembly transmission shaft housing 122 wherein the various connectably intercommunicating rack-and-pinion transmission shafts are supported therein in journaled relationship one axially within the other as illustrated, and the operational head de-boning assembly connecting rod housing 124 wherein the various trigger and gripper blade intercommunicating reciprocally operating connecting rods are supported also therein in journaled relationship one axially within the other as illustrated.

Lastly, in completing the makeready set of said machine 10 the operator adjusts the reset limit switch 126 by means of threadably adjusting and fixing to set the reset limit switch adjustment bolt assembly 128 which is assembled to said longitudinal cam 22 as best shown respectively in FIGS. 2 and 3, such that when, and only when, a full recycle return to start position of said longitudinal cam 22 is completed as sensed by the making of contact of said reset limit switch 126 will said machine 10 then be rendered fully functional at the end of each de-boning processing operation cycle as aforedescribed for the continued de-boning processing operation thereof. Thus completes the makeready set procedure and sequence for said machine 10.

The single station anatomical section de-boning machine 10 as herein described is preferably constructed from stainless steel with certain of the parts thereof as previously described made from rigid but resilient plastic material, however, any other suitable materials or combinations thereof may be used.

Referring now to the structurally simplified top plan views of machine 10 as shown in FIGS. 4 through 7 inclusive to more fully describe the operation thereof, wherein is illustrated the machine 10 de-boning processing sequence of a typical exemplary anatomical section 130 as previously herein defined which has an elongated bone shaft member 132 with a large bone shaft end protuberance 134 at one end thereof and a small bone shaft end protuberance 136 at the other end thereof as shown, all of which bone structure is centrally contained within the anatomical section bone encasing meat 138 also as shown.

Presuming said machine 10 has been makeready set by those procedures heretofore detailed to a typical exemplary anatomical section 130 for the operational de-boning processing run of a preclassified anatomical section batch having configuration, weight, and dimension, as well as handling and machine processing, characteristics physically similar to those of said typical exemplary anatomical section 130, and, although not illustrated in the structurally simplified views of FIGS. 4 through 7, presuming, also, that the operational head blade-protective pivotal cabinet cover 28 has been closed thereby closing to contact the normally open pivotal cabinet cover electrical interlock safety switch 26 and that the electrical/pneumatic emergency feed lines ON/OFF-RESET safety switch 24 has been elevated from the depressed OFF to the upwardly disposed ON position whereby said machine 10 is thus rendered fully functional and operational.

The operational functions shown in FIG. 4 illustrate a manually oriented insertable feeding of the anatomical section 130 to the machine 10 with the large bone shaft end protuberance 134 of said anatomical section 130 directed to depressably engage the machine plunger trigger 20 and by means of the communicating trigger connecting rod 110 thereby translate a machine rearwardly displacement of the plunger trigger switch contact bracket 52 adjustably assembled compressively to the threaded trigger shaft 56 end of said communicating trigger connecting rod 110 by means of threaded trigger shaft nuts 54, thus in turn causing a making of contact of the plunger trigger electrical solenoid air valve limit switch 42, and thus also initiating by such manually fed oriented insertion of said anatomical section 130 as aforedescribed the machine 10 transition to high-speed automatic de-boning processing operation as set into sequence upon a making of contact of said switch 42 in a functionally operational machine 10.

As shown in FIG. 5, a making of contact of the plunger trigger electrical solenoid air valve limit switch 42 pneumatically activates the cooperative toggle-acting anatomical section gripper blade cylinder 44 to cause an extension of the cylinder piston 102 thereof which extensive motion is transmitted through the arm 106 to connecting rod 104 which linerally translates to a pivotal closing force on the toggle-acting linkage assembly 108 thereby causing the cooperative toggle-acting anatomical section gripper blades 36 to close as shown and securely engage and retain an anatomical section 130 for de-boning processing operations about that proximity inwardly of the large bone shaft end protuberance 134 thereof. It should be noted that by regulation of the air pressure in cylinder 44 the depth of engagement of said gripper blades 36 is controlled, and as is best illustrated in FIG. 1, but also shown in FIG. 15, each of said gripper blades 36 is provided with a recessed blade profile 140 which adapts said gripper blades 36, upon adjustable air pressure regulation to said cylinder 44, to clampable engagement and secure retention of an anatomical section 130 by the large bone shaft end protuberance 134 rather than the cutting into or nicking thereof avoiding at this stage of de-boning processing operation any bone fragment contamination of the bone encasing meat 138 to be removed from the elongated bone shaft member 132. Simultaneously, closing to contact of the plunger trigger electrical solenoid air valve limit switch 42 also activates the shaped cooperative meat cutting and stripping blade cylinder 84 to retract the cylinder piston 46 thereof and first coactively drive, by the rack-and-pinion assembly 47 means previously described but not instantly shown for clarity of illustration, to closing about the elongated bone shaft member 132 the shaped cooperative meat cutting and stripping blades 38 in a close longitudinally off-set proximity to said gripper blades 36 as shown and thereafter cause the contact bracket 60 adjustably assembled to said piston 46 to engage and close to contact the compound multiple-acting pneumatic cylinder main drive piston electrical solenoid air valve limit switch 48 which in turn activates the compound multiple-acting pneumatic cylinder main drive 116 to extend the main drive piston 40 thereof and by means of arm 120 transmit the main drive piston 40 extensive machine rearward motion to the gripper blade support tube 118 and thereby commence machine rearward displacement of the closed cooperative toggle-acting anatomical section gripper blades 36 and the anatomical section 130 gripped thereby resulting in the longitudinally peelable removal of said bone encasing meat 138 from the elongated bone shaft member 132 as shown, which is coincidentally not only commencement of the draw cycle mode of said machine 10 but being also commencement of a machine rearward displacement movement of the compound multiple-acting pneumatic cylinder piston 45 driven longitudinal cam 22 whereby subsequent machine 10 high-speed automatic de-boning processing operational functions as hereinafter described are either initiated or terminated. It is at this point, however, that de-boning processing operations are fully automatic and it should also be noted that the speed of the draw cycle mode of said machine 10 is controlled by regulating the air pressure set on the pneumatic cylinder main drive 116.

The operational de-boning processing stage shown in FIG. 6 is that of next sequentially accommodating a continued bone fragment free longitudinally peelable removal of said bone encasing meat 138 about the small bone shaft end protuberance 136 of the elongated bone shaft member 132 as the machine rearward draw cycle mode continues, which proceeds to accomplishment upon concurrently occurring draw cycle mode machine rearward displacement passage of said longitudinal cam 22 past the detented peeling blade electrical solenoid air valve limit switch 72 thereby pneumatically activating the detented peeling blade cylinder 74 to retract piston 76 and also thereby coactively drive, by the rack-and-pinion assembly 78 means previously described but not instantly shown for clarity of illustration, to closing machine rearward of the shaped cooperative meat cutting and stripping blades 38 about the elongated bone shaft member 132 the detented peeling blades 66 preparatory to effecting peelable removal thereby of said bone encasing meat 138 about the small bone shaft end protuberance 136 and immediately prior to subsequent sequential draw cycle mode passage of said longitudinal cam 22 past the shaped cooperative meat cutting and stripping blade electrical solenoid air valve limit switch 80 thereby activating the double-acting side of cylinder 84 to extend the cylinder piston 46 thereof and in turn coactively reverse drive previously referenced rack-and-pinion assembly 47 to open the shaped cooperative meat cutting and stripping blades 38 as shown in FIG. 6, and thereby in turn enable continued draw cycle mode bone fragment free longitudinally peelable removal of said bone encasing meat 138 about the small bone shaft end protuberance 136 of the elongated bone shaft member 132 of said typical exemplary anatomical section 130 by means of said detented peeling blades 66.

The final operational de-boning processing stages, including separation of the elongated bone shaft member 132 after accomplishing a severing of any remaining meat-to-bone tendon connecting tissue 142 to thereby yield a substantially bone fragment free anatomical section meat product 144, and thereafter the recycle to reset of said machine 10 for continued de-boning processing operation cycles as shown at the outset in FIG. 4, is shown in FIG. 7. As illustrated, progressive machine rearward draw cycle mode displacement has resulted in a longitudinally peelable removal of the bone encasing meat 138 about the small bone shaft end protuberance 136 as accomplished by means of said detented peeling blades 66, which thereafter distendedly positions for severing any remaining meat-to-bone tendon connecting tissue 142 as completed by means of the scissor-acting tendon severing blades 86 which are cycled to function upon draw cycle mode machine rearward displacement passage of longitudinal cam 22 past the tendon severing blade electrical solenoid air valve limit switch 88 thereby pneumatically activating the tendon severing blade cylinder 90 to retract piston 92 and also thereby coactively drive, by the rack-and-pinion assembly 94 means previously described but not instantly shown for clarity of illustration, to close said tendon severing blades 86 as shown and thereby cut any remaining meat-to-bone tendon connecting tissue in separation of the elongated bone shaft member 132 from the removed anatomical section meat 143 to thereby yield a substantially bone fragment free anatomical section meat product 144.

Continued machine rearward draw cycle mode as driven by extending piston 40 of the compound multiple-acting pneumatic cylinder main drive 116 next advances said longitudinal cam 22 moved machine rearward thereby past the machine recycle electrical solenoid air valve limit switch 98 whereupon an activation thereof initiates product and bone discharge and machine 10 recycle and reset events as hereinbefore described and explained in detail during recitation of the machine 10 set procedure such that it is deemed the aforegoing is sufficient, in view of which any further detailing thereof is not now necessary to explain those mechanisms whereby said machine 10 is functionally recycled and reset to that disposition as illustrated in FIG. 4 for accomplishment of continued de-boning processing operations.

Figure 8:
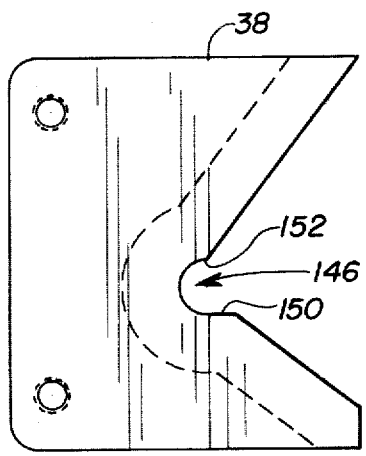
FIG. 8 is an enlarged front elevation of one of the shaped cooperative meat cutting and stripping blades of the operational head de-boning assembly of said machine.
Figure 10:
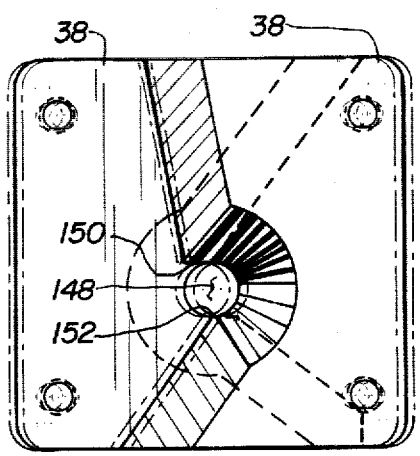
FIG. 10 is a functionally operational assembly view of the shaped cooperative meat cutting and stripping blades as separately illustrated in FIG. 8 and FIG. 9, also showing therein in phantom the automatically adjustable compensating feature thereof to accommodate bone shaft diameter variations during cooperative meat cutting and stripping operational employment.
Figure 9:
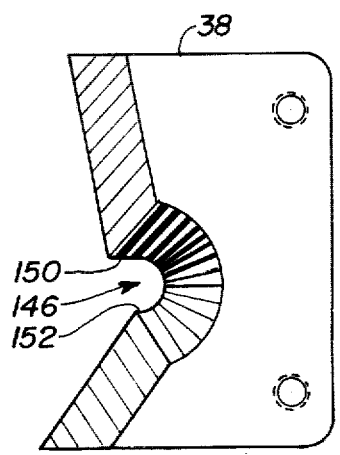
FIG. 9 is an enlarged front elevation of the other of the shaped cooperative meat cutting and stripping blades of the operational head de-boning assembly of said machine.

Although not fully detailed hereinbefore, the configuration of the shaped cooperative meat cutting and stripping blades 38 as best shown in FIGS. 8 through 10 is an important teaching of the instant machine 10 invention and is at this point most suitably covered. The coactive blade 38 assembly as illustrated in combination in FIG. 10 is comprised of the respective blade 38 halves as illustrated in FIGS. 8 and 9, wherein the improved feature shown is the "J"-shaped opening 146 of the respective blade 38 halves wherein said "J"-shaped opening 146 of one blade 38 half is oriented to inversely communicate with respect to the "J"-shaped opening 146 of the other blade 38 half such that when the respective blade halves are so coactively assembled in use application upon a pivotal closing thereof as represented by illustration in FIG. 10, there is formed a variably accommodating bone shaft opening 148 being circular or elliptical as variously illustrated in FIG. 10, said opening 148 being formed by coactive communication of the "J"-shaped long leg 150 of one blade 38 half with the "J"-shaped short leg 152 of the other blade 38 half whereby variations from set in the average elongated longitudinal bone shaft dimension diameter as an anatomical section bone is being drawn therethrough during accomplishment of peelable meat stripping therefrom by means of said blades 38, such diameter dimension variations may be accommodated without scraping bone fragment material from the bone shaft to thereby otherwise contaminate the removed anatomical section meat product being delivered.

Figure 11:
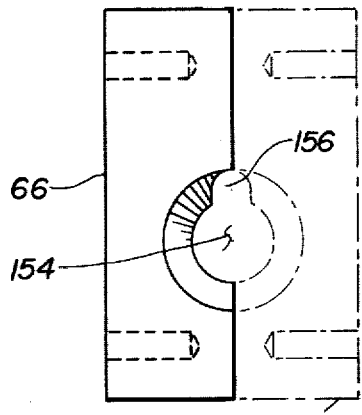
FIG. 11 is a functionally operational assembly view of the other shaped cooperative peeling blades which function to cooperatively accomplish the completion of inverse meat peeling from an anatomical section bone shaft about the smaller protuberance thereof and the bone-to-meat tendon tissue connection therebetween.
Figure 12:
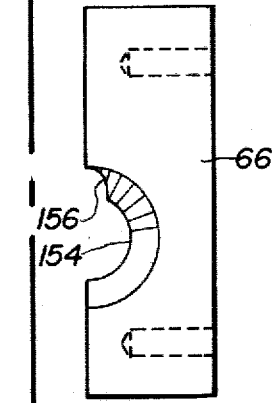
FIG. 12 is a front elevation of the other of the other shaped cooperative peeling blade shown in phantom in FIG. 11.
Figure 13:
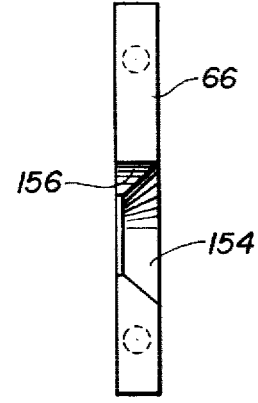
FIG. 13 is a vertical side elevation of the other of the other shaped cooperative peeling blade shown in FIG. 12 as seen along the line 13—13 thereof.

Another important blade configuration teaching of the instant machine 10 invention is that of the detented peeling blades 66 as is best illustrated in FIGS. 11 through 13 wherein the conventional detented circular opening 154 has been modified by an upwardly disposed half-circle opening 156 to more suitably accommodate peelable removal of tendon connected meat about the smaller bone end protuberance thereby enhancing the optimum removed meat yield obtained.

Figure 14:
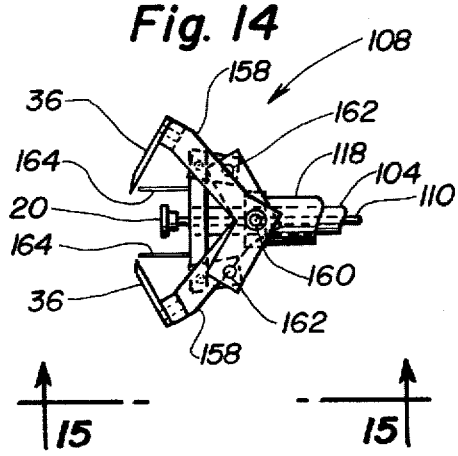
FIG. 14 is a top plan view of the operational head de-boning assembly shown in FIG. 3 as seen along the line 14—14 thereof.
Figure 15:
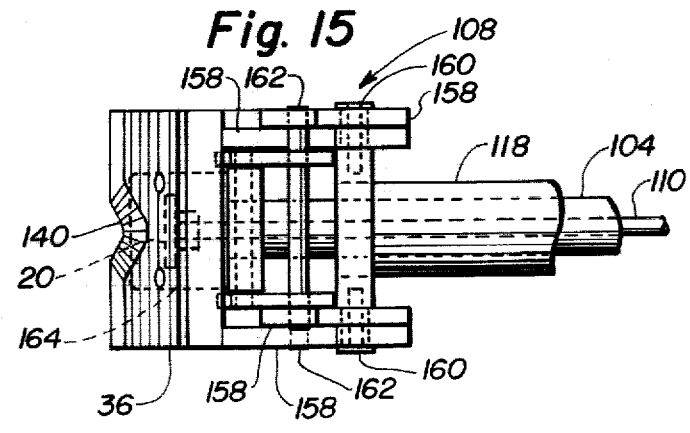
FIG. 15 is an enlarged side elevation of the operational head de-boning assembly shown in FIG. 14 as seen along the line 15—15 thereof.

Lastly, in FIGS. 14 and 15 additional detail of the pivotally operable toggle-acting linkage assembly 108 is shown, wherein are seen the cooperative "L"-shaped gripper blade supporting pivot legs 158 thereof coactively operable arcuately to close and open said gripper blades 36 about linear to pivotal motion translation pivot pins 160 with supplemental pivot pins 162 coactively operable therewith. Also shown as additional structural detail respectively in FIGS. 14 and 15 are the laterally spaced anatomical section trigger guides 164 which aid in accomplishing manually oriented operator fed insertion of an anatomical section to a depressable engagement with the machine plunger trigger 20 therebetween.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A single station anatomical section de-boning machine for receiving successively by manually oriented insertion thereto anatomical sections for initiating a machine activation into an automatic high-speed de-boning cycle sequence to deliver respectively therefrom a separated substantially bone fragment free anatomical section meat component and an anatomical section elongated bone component, said machine comprising in combination:
    a. a longitudinally disposed support frame structure having interconnected horizontal and vertical members,
    b. a machine integrated electrical and pneumatic circuit system operational through a machine emergency ON/OFF-RESET safety switch means,
    c. additionally a machine electrical interlock safety switch means,
    d. a machine forward infeed end and a machine rearward delivery end respectively positioned at the opposite longitudinally disposed ends of said machine and therebetween provided with a double-acting main cylinder piston drive means reciprocally operable along a predetermined path coincidental with the centrally intermediate longitudinal axis disposition of said machine extensively toward the rearward delivery end thereof in a machine draw cycle mode and retractably toward the forward infeed end thereof,
    e. a machine plunger trigger means depressively operable upon a manually oriented insertion thereagainst of an anatomical section for de-boning processing operations to thereupon initiate activation of said machine,
    f. an anatomical section gripper blade means movably operable to clampably engage and securely retain said anatomical section prepatory to said machine draw cycle mode rearward displacement thereof along said predetermined path upon extension of said reciprocally operable main cylinder piston drive means,
    g. a pivotally functional but longitudinal stationary operational head de-boning assembly embodying in combination a triple set of longitudinally spaced pivotally acting blade means being respectively a set of shaped cooperative meat cutting and stripping blades plus a set of detented peeling blades and a set of scissor-acting tendon severing blades all activated by a cam to sequentially function in pivotal closable engagement of said anatomical section meat component on alignment of said centrally intermediate longitudinal axis disposition of said machine contemporaneously during rearward machine draw cycle mode displacement of said gripper blade means clampably engaged and securely retained anatomical section therealong and therethrough to effect a peelable removal and separation of said anatomical section meat component from said anatomical section elongated bone component of said anatomical section and thereafter a first and a second release means to operationally effect respective releases thereof,
    h. a machine recycle means functional to automatically effect reciprocating retraction of said double-acting main cylinder piston drive means toward the forward end of said machine, and
    i. a machine reset means to functionally posture said machine automatically for continued successive manually initiated de-boning operation utilization thereof.

2. A single station anatomical section de-boning machine according to claim 1 in which said double-acting main cylinder piston drive means is initiated into piston extensive draw cycle mode activation of the making of contact of an electrical limit switch means.

3. A single station anatomical section de-boning machine according to claim 2 in which said double-acting main cylinder piston drive means is a pneumatic cylinder.

4. A single station anatomical station de-boning machine according to claim 2 in which said electrical limit switch means will not make contact unless said electrical interlock safety switch means is also made in a closed contact position.

5. A single station anatomical section de-boning machine according to claim 4 in which said electrical interlock safety switch means is a normally open switch.

6. A single station anatomical section de-boning machine according to claim 5 in which said electrical interlock safety switch means is maintained in a closed contact position by means of the closing of an operational head blade-protective pivotal cabinet cover of said machine.

7. A single station anatomical section de-boning machine according to claim 4 in which said machine emergency ON/OFF-RESET safety switch is a push-pull switch.

8. A single station anatomical section de-boning machine according to claim 7 in which said push-pull switch operates, with said electrical interlock safety switch means when made in a closed contact position, on a pull setting thereof to accomplish total and immediate machine integrated electrical and pneumatic circuit system activation.

9. A single station anatomical section de-boning machine according to claim 7 in which said push-pull switch operates, with said electrical interlock safety switch means made in a closed contact position, on a push setting thereof to accomplish total and immediate machine integrated electrical and pneumatic circuit system de-activation.

10. A single station anatomical section de-boning machine according to claim 1 wherein said anatomical section gripper blade means is comprised of a spaced set of cooperative toggle-acting anatomical section gripper blades, each gripper blade thereof being coactively operable arcuately one with the other, coequally, in accomplishing a closing and opening thereof lateral to said centrally intermediate longitudinal axis disposition of said machine.

11. A single station anatomical section de-boning machine according to claim 10 wherein said each gripper blade thereof is provided with a recessed blade profile respectively complementary one to the other.

12. A single station anatomical section de-boning machine according to claim 1 wherein said set of shaped cooperative meat cutting and stripping blades is comprised of coactively operable blades each having respectively one with regard to the other an inverse J-shaped opening functional coequally in accomplishing upon pivotal closing thereof lateral to said centrally intermediate longitudinal axis disposition of said machine an automatically compensating engagement of said anatomical section elongated bone component variably to the crossectional diameter dimension thereof.

13. A single station anatomical section de-boning machine according to claim 1 wherein said set of detented peeling blades is comprised of a coactively operable blade pair each blade of said pair having respectively one with regard to the other communicably with a conventional detented circular opening portion thereof an upwardly disposed half-circle opening therein to enable an unimpeded peelable passage therethrough of any remaining anatomical section meat component to anatomical section elongated bone component tendon connecting tissue during draw cycle mode operations.

14. A single station anatomical section de-boning machine according to claim 1 wherein said triple set of longitudinally spaced pivotally acting blade means are respectively powered by an electro-pneumatic cylinder operable through a rack-and-pinion drive means.

* * * * *